S. CHILDS.
STILL FOR FATS, OILS, AND RESINS.

No. 11,059. Patented June 13, 1854.

Witnesses
Lemuel W. Serrell
Thomas G. Harold

Inventor
Sand Childs

UNITED STATES PATENT OFFICE.

SAMUEL CHILDS, OF NEW YORK, N. Y.

IMPROVEMENT IN STILLS FOR DISTILLING FATTY BODIES.

Specification forming part of Letters Patent No. 11,059, dated June 13, 1854.

*To all whom it may concern:*

Be it known that I, SAMUEL CHILDS, of the city, county, and State of New York, have invented and made certain new and useful Improvements in Apparatus for Distilling or otherwise Treating Oils, Fats, Resins, and other Substances; and I do hereby declare that the following is a full, clear, and exact description of the construction and operation of the same, reference being had to the annexed drawings, making part of this specification, wherein—

Figure 1:
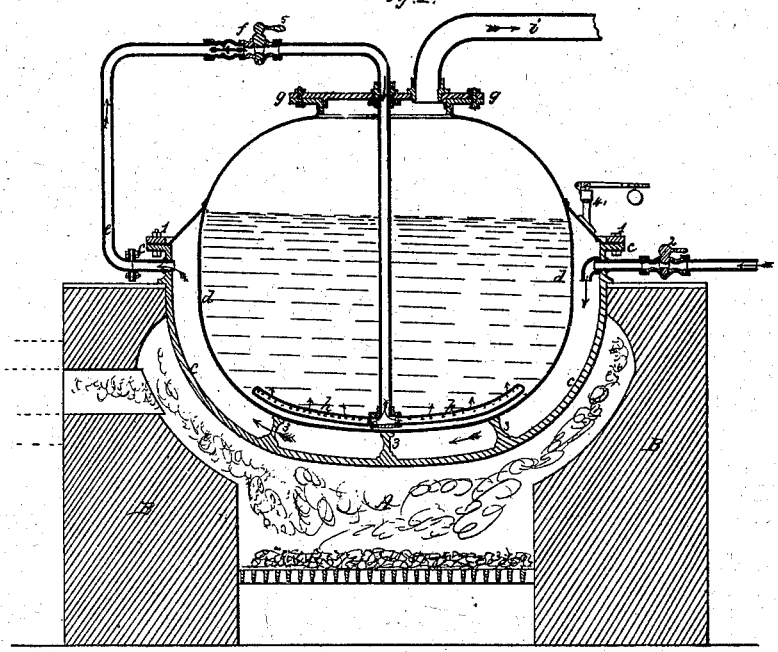
Figure 2:
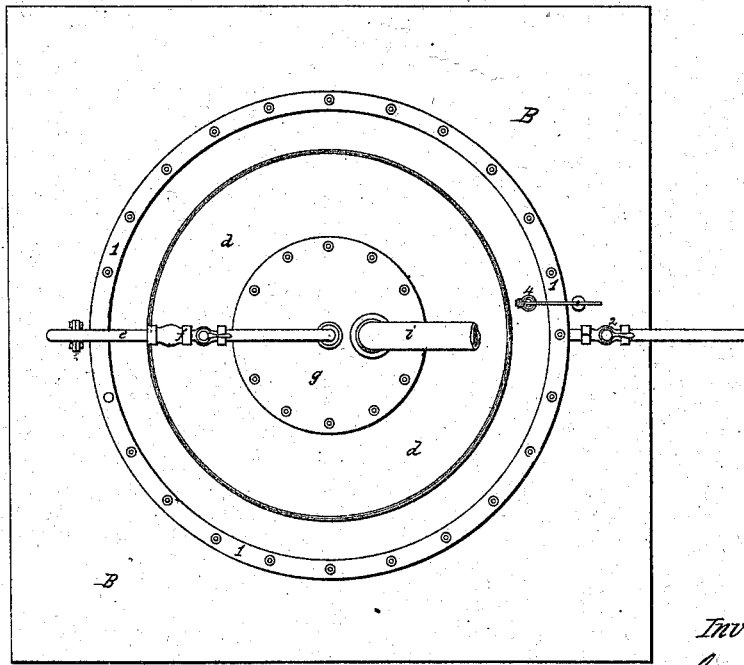

Figure 1 is a sectional elevation of the apparatus complete. Fig. 2 is a plan of the same.

The like marks of reference denote the same parts.

The nature of my said improvements consists in passing a stratum of steam between the still or vessel containing the material under treatment and the fire which heats the same, said steam being confined by an exterior case or jacket; and the induction and exit of the steam being regulated by cocks, the following effects are produced: The intervening stratum of steam becomes a conducting medium that transmits heat from the fire to the articles under treatment in the inner vessel, by which the said contents are heated to any required point from that of boiling water up to 500° or 600° of heat; second, the stratum of steam and its exterior case enables the attendant to regulate the amount of heat to the utmost exactness, whether the fire be very hot or not, for if the steam be allowed to remain in the surrounding jacket any length of time it will get very hot and communicate its heat to the interior vessel; but if it passes rapidly through the jacket much less heat will be communicated to the material under treatment; hence in distilling oils, fats, and resins, and boiling oils, varnishes, &c., in case the attendant finds there is danger from too much heat, all he has to do is to open the escape-cock and let the steam blow through, which cools down the apparatus without touching the fire; hence an immediate preventative is at hand to avoid accident from inflammable products either boiling over or themselves becoming damaged by burning, and no leak can pass into the fire.

In the annexed drawings my invention is shown as applied to a still suitable for distilling fats, oils, resins, india-rubber, and other articles wherein it is necessary to supply heated steam to the material under treatment, as well as applying heat to the outside of the still. In this case, by carrying the steam from the jacket directly into the material under treatment, the advantage is attained of protecting the still from injury by the fire and the material therein from burning, at the same time that the steam is heated as high as required for being passed into the still, instead of requiring, as heretofore, that the steam be heated in a separate coiled pipe in a furnace.

A represents the fire-place, with the brick-work B and flues, as usual.

c is a metallic jacket, which I prefer to be cast-iron, set in the brick-work, and provided with ribs or supports 3 in the bottom, sustaining the copper still d, which is connected to the jacket c by a flange, as at 1 1.

2 is a pipe and cock supplying a regulated amount of steam from any proper boiler to the space between the jacket and still, from which the steam is conveyed by a pipe, e, through the cover g of the still to a perforated pipe, h, in the bottom.

f is a check-valve opening toward the still, so as to allow the steam to pass in, but prevent the contents of the still from being carried back in case of a partial vacuum in the jacket; and 5 is a cock in the pipe e, to confine the contents of the still.

i is a pipe leading to any proper condenser, for liquefying the vapors that pass off from the still.

4 is a safety-valve to regulate the maximum pressure in the steam-jacket.

It will now be understood that the intervening stratum of steam becomes a conductor of the heat, and that without materially increasing the pressure of the steam, and at the same time the steam thus highly heated passes into the material under treatment in the still, when so required, at a very high temperature, materially aiding the operation, and that to a better advantage than though the steam were heated separately, because the internal and external temperatures always nearly correspond.

I am aware that a bath of melted metal has been used to heat the contents of a still or vessel; but in this case the circulating power of the melted metal is so little that one part of the same will be hotter than the other, whereas in my apparatus the steam easily diffuses the heat, and with a metal bath there is no facility for cooling down in case too much heat is attained; and I am also aware that a "medial liquid"—such as salt and water and oils—has been proposed; but with oils and similar liquids that can be raised to a high degree of heat there is a very great loss by burning, as well as great expense to supply the same, and where water or the compounds thereof is used there cannot be a sufficient degree of heat attained—say 400° or 500° Fahrenheit—which is required for oils, &c., without the apparatus being so strong to resist the pressure that its utility is defeated, and in case of explosion the damage would be immense, whereas in my case not more than two or three atmospheres will be required in the steam-jacket; and I am aware that steam under pressure has been used for heating vacuum-pans and other articles for sugar-boiling, &c.; but I am not aware that steam has ever been used as an intervening stratum between the vessel containing the materials under treatment and a fire heat to operate in the manner and with the advantages set forth. Therefore What I desire to secure by Letters Patent is—

1. The use of a stratum of steam within a jacket or case between a fire heat and a vessel containing any article under treatment, whereby the heat applied to said vessel can be any desired amount, and the same can be regulated to any desired point, according to the supply and delivery of the steam, as specified.

2. Passing the steam from a jacket, as above set forth, directly into the still and material under treatment, for the purposes and as specified.

In testimony whereof I have hereunto set my signature this 16th day of March, 1854.

SAML. CHILDS.

Witnesses:
 LEMUEL W. SERRELL,
 THOMAS G. HAROLD.